United States Patent
Snowdon et al.

(10) Patent No.: US 10,190,919 B2
(45) Date of Patent: *Jan. 29, 2019

(54) DIFFERENTIAL THERMISTOR CIRCUIT

(71) Applicant: FAIRCHILD SEMICONDUCTOR CORPORATION, Sunnyvale, CA (US)

(72) Inventors: Kenneth P. Snowdon, Falmouth, ME (US); Roy Yarbrough, Hiram, ME (US)

(73) Assignee: Fairchild Semiconductor Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,155

(22) Filed: Aug. 24, 2017

(65) Prior Publication Data
US 2017/0350768 A1    Dec. 7, 2017

Related U.S. Application Data

(60) Continuation of application No. 14/272,832, filed on May 8, 2014, now Pat. No. 9,772,233, which is a division of application No. 13/014,317, filed on Jan. 26, 2011, now Pat. No. 8,727,616.

(60) Provisional application No. 61/325,634, filed on Apr. 19, 2010.

(51) Int. Cl.
| | |
|---|---|
| *G01K 7/00* | (2006.01) |
| *G01K 7/22* | (2006.01) |
| *G05D 23/19* | (2006.01) |
| *G05D 23/24* | (2006.01) |

(52) U.S. Cl.
CPC ............ *G01K 7/22* (2013.01); *G05D 23/1906* (2013.01); *G05D 23/24* (2013.01)

(58) Field of Classification Search
USPC .......................... 374/178, 170, 183; 327/512
See application file for complete search history.

(56) References Cited

U.S. PATENT DOCUMENTS

| | | |
|---|---|---|
| 3,810,152 A | 5/1974 | White |
| 3,895,292 A | 7/1975 | Zair et al. |
| 4,023,094 A | 5/1977 | Adams |

(Continued)

OTHER PUBLICATIONS

Korean Application Serial No. 10-2011-0036099, Office Action dated Apr. 20, 2017, 5 pgs.

(Continued)

*Primary Examiner* — Mirellys Jagan
(74) *Attorney, Agent, or Firm* — Brake Hughes Bellermann LLP (57) ABSTRACT

In a general aspect, a circuit can include a first resistor configured to be coupled to a first terminal of a temperature-sensitive resistance, a second resistor configured to be coupled to a second terminal of the temperature-sensitive resistance and a temperature information circuit. The temperature information circuit can be configured to: receive a first voltage from the first terminal of the temperature-sensitive resistance; receive a second voltage from the second terminal of the temperature-sensitive resistance; and provide temperature information based on the first voltage and the second voltage. The temperature information circuit can include a first comparison circuit configured to determine a difference between the first voltage and the second voltage, and a second comparison circuit configured to compare an output of the first comparison circuit to a reference.

20 Claims, 5 Drawing Sheets

(56) References Cited

U.S. PATENT DOCUMENTS

| | | | |
|---|---|---|---|
| 4,734,554 | A | 3/1988 | Tateda et al. |
| 5,886,515 | A | 3/1999 | Kelly |
| 7,089,146 | B1 | 8/2006 | D'Aquino et al. |
| 7,309,157 | B1 | 12/2007 | Aslan et al. |
| 7,746,087 | B2 | 6/2010 | Song et al. |
| 8,727,616 | B2 | 5/2014 | Snowdon et al. |
| 2008/0031303 | A1 | 2/2008 | Bowden et al. |
| 2009/0015316 | A1 | 1/2009 | Song et al. |
| 2009/0196326 | A1 | 8/2009 | Tsukude |
| 2011/0013670 | A1 | 1/2011 | Tustaniwskyj et al. |
| 2011/0254618 | A1 | 10/2011 | Snowdon et al. |
| 2013/0121377 | A1 | 5/2013 | Furuichi |
| 2014/0126608 | A1 | 5/2014 | Ozaki et al. |
| 2014/0219316 | A1 | 8/2014 | Tashiro et al. |
| 2014/0269834 | A1 | 9/2014 | Eberlein |
| 2015/0063421 | A1 | 3/2015 | Jin et al. |
| 2015/0219503 | A1 | 8/2015 | Yoshida |

OTHER PUBLICATIONS

Chinese Application Serial No. 201110102597.7, Response filed May 14, 2014 to Office Action dated Dec. 30, 2012, w/English Claims, 13 pgs.

Chinese Application Serial No. 201110102597.7, Response filed Aug. 23, 2013 to Office Action dated Feb. 8, 2013, 9 pgs.

Chinese Application Serial No. 201110102597.7, Voluntary Amendment filed May 15, 2015, w/English Claims, 7 pgs.

Chinese Application Serial No. 201110102597.7, Office Action dated Sep. 9, 2014, w/English Translation, 6 pgs.

U.S. Appl. No. 13/014,317, Response filed Apr. 23, 2013 to Non-Final Office Action dated Jan. 23, 2013, 10 pgs.

U.S. Appl. No. 13/014,317, Response filed Aug. 27, 2013 to Final Office Action dated Jun. 27, 2013, 8 pgs.

U.S. Appl. No. 13/014,317, Response filed Sep. 27, 2013 to Final Office Action dated Jun. 27, 2013 and Advisory Action dated Sep. 12, 2013, 7 pgs.

U.S. Appl. No. 13/014,317, Response filed Nov. 27, 2013-13 to Final Office Action dated Jun. 27, 2013 and Advisory Action dated Sep. 12, 2013, 7 pgs.

U.S. Appl. No. 13/014,317, Response filed Sep. 27, 2013 to Advisory Action dated Sep. 12, 2013, 7 pgs.

U.S. Appl. No. 13/014,317, Advisory Action dated Sep. 12, 2013, 3 pgs.

U.S. Appl. No. 13/014,317, Advisory Action dated Oct. 11, 2013, 3 pgs.

U.S. Appl. No. 13/014,317, Final Office Action dated Jun. 27, 2013, 10 pgs.

U.S. Appl. No. 13/014,317, Non-Final Office Action dated Jan. 23, 2013, 11 pgs.

U.S. Appl. No. 13/014,317, Notice of Allowance dated Jan. 7, 2014, 9 pgs.

U.S. Appl. No. 13/014,317, Response filed Dec. 28, 2012 to Restriction Requirement dated Nov. 29, 2012, 6 pgs.

U.S. Appl. No. 13/014,317, Restriction Requirement dated Nov. 29, 2012, 6 pgs.

Chinese Application Serial No. 201110102597.7, Office Action dated Feb. 8, 2013, 15 pgs.

Paine, C. G. et al., "A low noise, high thermal stability, 0.1 K test facility for the Planck HFI bolometers," AIP Conf. Proc., vol. 613, May 10, 2002, 1651-1657.

Chinese Application Serial No. 201110102597.7, Response filed May 14, 2014 to Office Action dated Dec. 30, 2013, w/English claims, 13 pgs.

U.S. Appl. No. 14/272,832, filed May 8, 2014, Allowed.

U.S. Appl. No. 13/014,317, filed Jan. 26, 2011, U.S. Pat. No. 8,727,616.

U.S. Appl. No. 61/325,634, filed Apr. 19, 2010, Expired.

DIFFERENTIAL THERMISTOR CIRCUIT

CROSS-REFERENCE TO RELATED APPLICATIONS

This application is a continuation of U.S. patent application Ser. No. 14/272,832, filed May 8, 2014, entitled "DIFFERENTIAL THERMISTOR CIRCUIT", now U.S. Pat. No. 9,772,233, which is a divisional application of U.S. patent application Ser. No. 13/014,317, filed Jan. 26, 2011, entitled "DIFFERENTIAL THERMISTOR CIRCUIT", now U.S. Pat. No. 8,727,616, which claims the benefit of priority under 35 U.S.C. 119(e) of U.S. Provisional Patent Application No. 61/325,634, filed on Apr. 19, 2010, each of which is incorporated herein by reference in its entirety.

BACKGROUND

A resistor is a two-terminal electronic component that produces a voltage across the terminals proportional to the current passing through them. Ohm's law defines the value of the resistor as the ratio of the voltage produced across the terminals to the current passing through them. A thermistor is a type of resistor whose resistance changes with temperature. Accordingly, the voltage across the terminals of the thermistor varies with the temperature and the current passing through them.

SUMMARY

This document discusses, among other things, an apparatus and method for providing an indication of temperature using first and second voltages from first and second terminals of a thermistor, including providing a first resistor configured to be coupled to the first terminal of the thermistor and a second resistor configured to be coupled to the second terminal of the thermistor.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, an integrated thermistor sense circuit configured to differentially sense a voltage across an external thermistor for comparison with a reference voltage. In an example, the reference voltage can be determined using a resistor, such as a resistor external to the integrated thermistor sense circuit. Further, the resistance of the thermistor can be compared to a reference resistance (e.g., the external resistor). In certain examples, differential sensing of the voltage across the thermistor can provide for enhanced signal integrity, or for the use of enhanced signal integrity techniques, in comparison with non-differential sensing of the voltage across the thermistor, allowing broader use in noisy environments.

In an example, a thermistor can be sensed in a single-ended fashion with a voltage forced across the thermistor and one or more series or parallel external resistors. In certain examples, the single-ended implementation can be bypassed with a large capacitor to remove a portion of the noise. However, this implementation can have a high power cost and a long settling time.

Figure 1A:
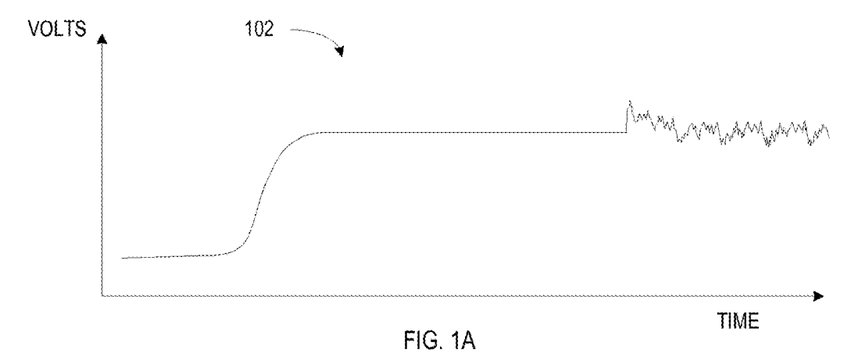
FIGS. 1A-1C illustrate generally examples of single-ended thermistor information, including a thermistor voltage, a filtered thermistor voltage, and universal serial bus (USB) data.
Figure 1B:
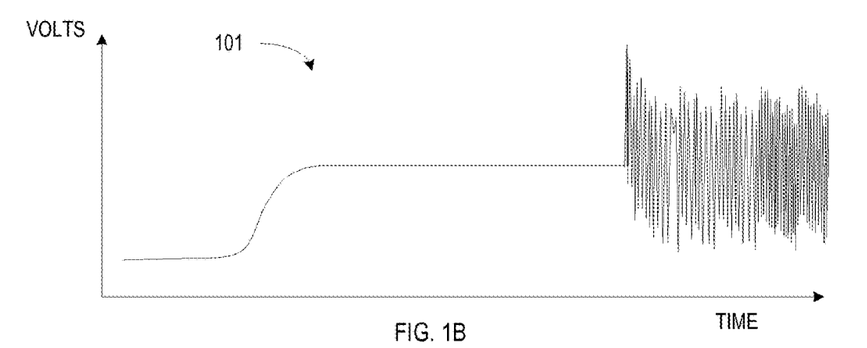
Figure 1C:
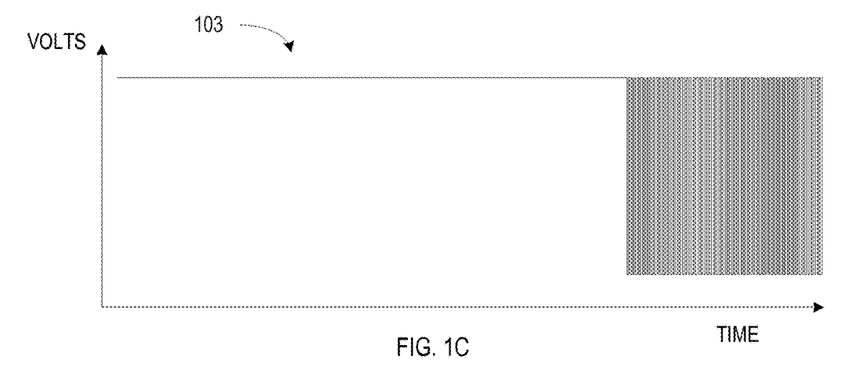

FIGS. 1A-1C illustrate generally examples of single-ended thermistor information, including a thermistor voltage 101, a filtered thermistor voltage 102, and universal serial bus (USB) data 103. In an example, the thermistor voltage 101 illustrates noise due to data crosstalk onto a single-ended thermistor input. In certain examples, the thermistor voltage can be filtered (e.g., using a large capacitor, etc.). The filtered thermistor voltage 102 illustrates that filtering the thermistor input can reduce the magnitude of the noise. However, the reduction can be insufficient for accurate temperature measurement. The source of noise can include, for example, the USB data 103, among other things.

In contrast, a thermistor sense circuit disclosed herein can include equivalent or substantially equivalent impedances on the positive and negative ends of a thermistor to reduce the level of common mode noise coupled to a thermistor sense input. The voltage across the thermistor can be compared to a reference resistance using a differential amplifier and a reference voltage, or the differential voltage can be converted to a ground referenced voltage, and a comparison can be made between the ground referenced voltage and one or more other ground referenced voltages.

Figure 2:
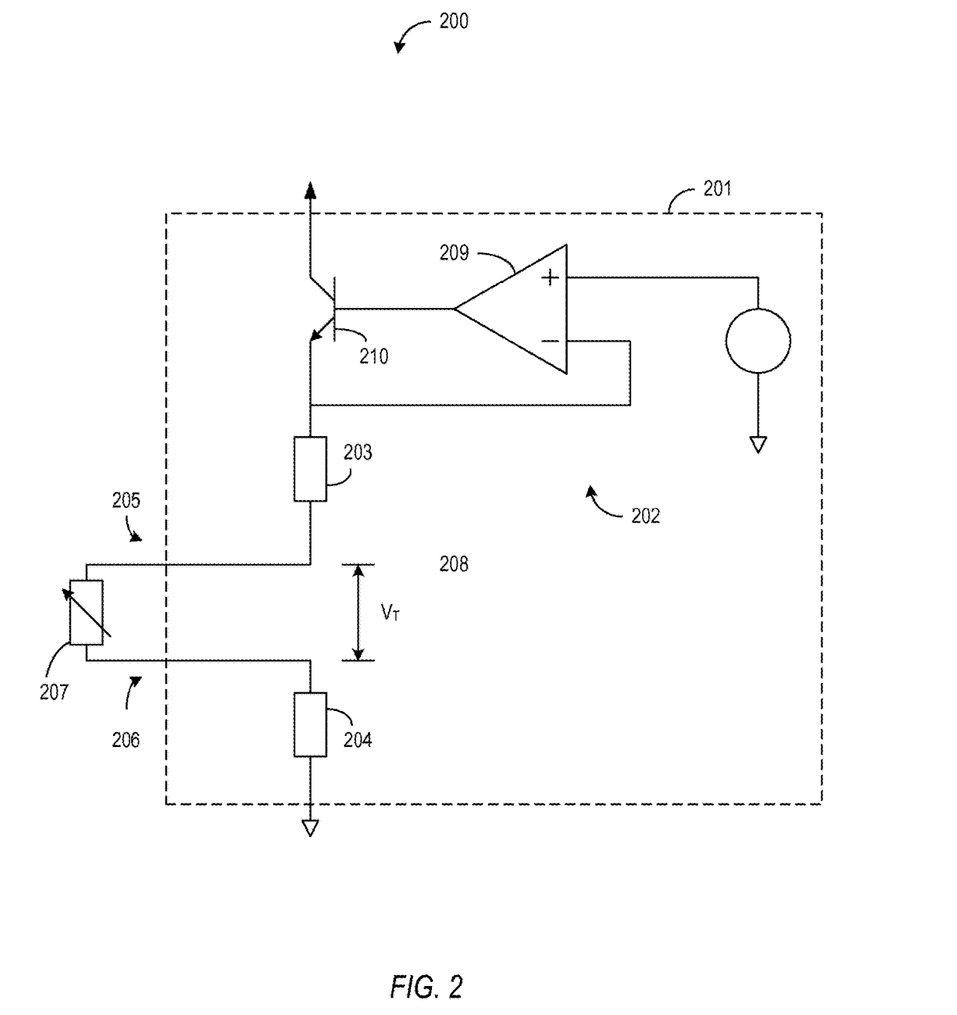
FIG. 2 illustrates generally an example of a differential thermistor circuit.

FIG. 2 illustrates generally an example of a differential thermistor circuit 200. In certain examples, an integrated circuit 201 includes the differential thermistor circuit 200. The differential thermistor circuit 200 can include a voltage source 202, a first impedance 203, and a second impedance 204. In certain examples, the first and second impedances 203, 204 can include respective first and second resistors. The integrated circuit 201 can include first and second terminals 205, 206 to connect the differential thermistor circuit 200 to a thermistor 207 or one or more other temperature sensitive impedances, such as a temperature sensitive resistor, etc., that, in certain examples, can be external to the integrated circuit 201. From a circuit perspective, the thermistor 207 is coupled in series and between the first and second impedances 203, 204. The voltage source 202 can provide a predetermined bias voltage across the series-connected first and second impedances 203, 204 and the thermistor 207. The voltage can induce a current through each of the series-connected components. A component voltage corresponding to the resistance and current flow through an individual component can be established across each of the individual series-connected components. The first and second terminals 205, 206 of the integrated circuit 201 can provide a component voltage ($V_T$) 208 that is proportional to the impedance of the thermistor 207. The impedance of thermistor 207 can indicate an ambient temperature about the thermistor 207.

In certain examples, the first and second impedances 203, 204 are substantially equal. The balanced nature of the first and second impedances 203, 204 can substantially reduce the effect of common mode noise at the first and second terminals 205, 206 of the integrated circuit 201. Such a reduction in noise, without the use of a large filter capacitor, can allow for quick and accurate temperature readings of the voltage $V_T$ 208 across the thermistor 207. In addition, substantial power savings can be realized using the circuit of FIG. 2 compared to a capacitor filtered thermistor circuit because the voltage supply need only be turned on for a short period of time to detect the voltage $V_T$ 208 across the thermistor 207. For capacitor filtered thermistor circuits, the circuit must be powered on long enough to allow the filtering effects of the capacitor to settle out. In certain examples, the first and second terminals 205, 206 of the integrated circuit 201 can be coupled to other components of the integrated circuit 201 and the voltage $V_T$ 208 received from the thermistor 207 can be processed to provide temperature information.

In various examples, the voltage source 202 can include an amplifier 209 and a transistor 210 arranged as a voltage follower. The amplifier 209 can include an operational amplifier, and the transistor 210 can include at least one of an NPN, PNP, NMOS, PMOS, or other transistor device. In an example, the voltage follower can force a voltage across the first and second impedances 203, 204 and the thermistor 207. Common mode noise can be terminated to ground on one side of the thermistor 207 using the second impedance 204, and common mode noise can be terminated to an AC ground on the other side of the thermistor 207 using the voltage follower and the first impedance 203.

Figure 3:
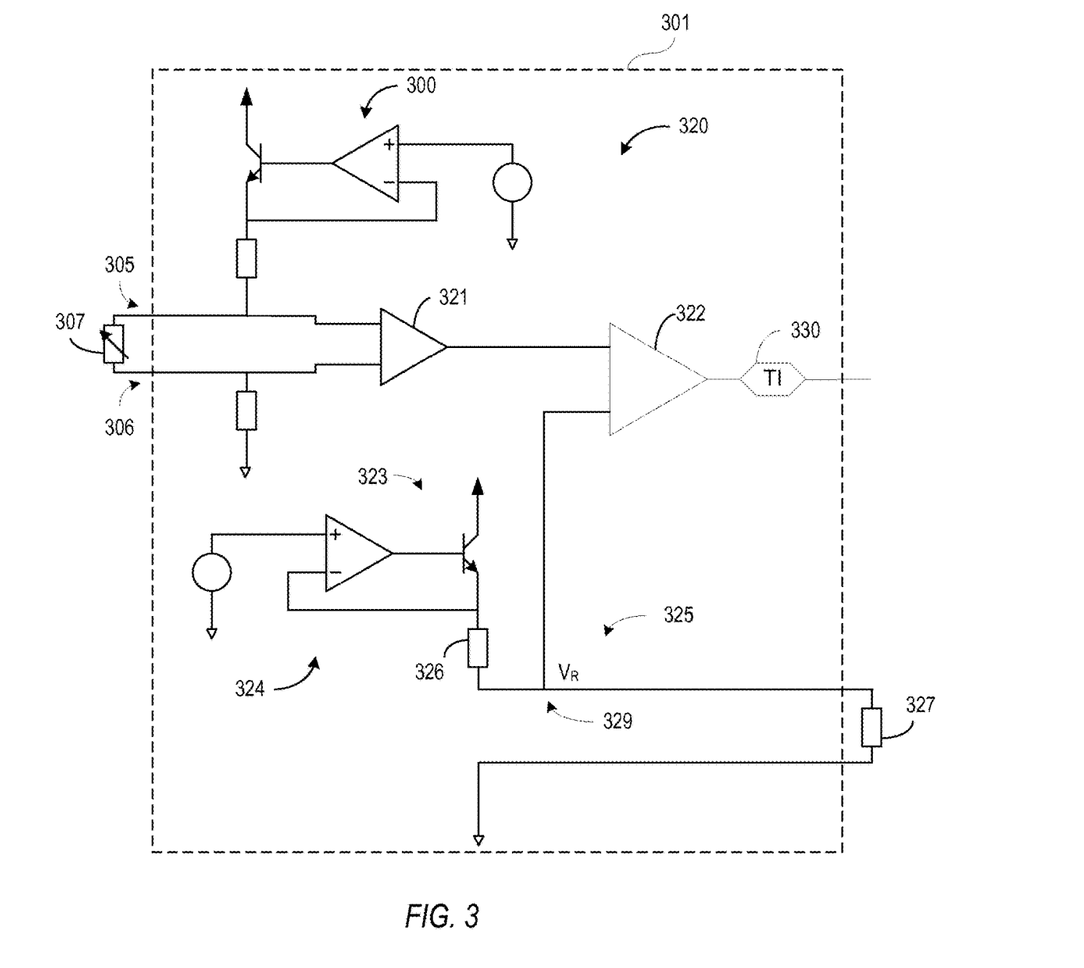
FIG. 3 illustrates generally an example of a differential thermistor processing circuit.

FIG. 3 illustrates generally an example of a differential thermistor processing circuit 320. In certain examples, the differential thermistor processing circuit 320 includes a differential thermistor circuit 300, such as the differential thermistor circuit 200 illustrated in FIG. 2, and additional components for processing information received from the thermistor 307. In certain examples, an integrated circuit 301 can include the differential thermistor processing circuit 320. In an example, the differential thermistor processing circuit 320 can include a differential amplifier 321, a comparator 322 and a reference circuit 323. The differential amplifier 321 can process the voltage received from the first and second thermistor terminals 305, 306 of the differential thermistor processing circuit 320. The reference circuit 323 can provide a reference signal, $V_R$, to compare with the output of the differential amplifier 321. The comparator 322 can compare the processed thermistor signal to the reference signal $V_R$ and provide temperature information (TI) 330 about the thermistor 307 using the relationship between the processed thermistor signal and the reference signal, $V_R$.

In an example, the reference circuit 323 can include a voltage source, such as a voltage follower 324. The voltage follower 324 can assert a voltage across a voltage divider 325. The voltage divider 325 can include a plurality of resistors 326, 327. In an example, a node 329 of the voltage divider 325 can be coupled to the comparator 322 to provide the reference voltage, $V_R$. In an example, a resistor 327 external to the integrated circuit 301 can be one of the plurality of resistors 326, 327 of the voltage divider 325. In certain examples, one or more external resistors, such as external resistor 327, can be selected to provide a programmable reference voltage to the comparator 322.

In an example, the temperature information 330 can be further processed by other circuits, such as other circuits of the integrated circuit 301, or other circuits external to the integrated circuit 301.

Figure 4:
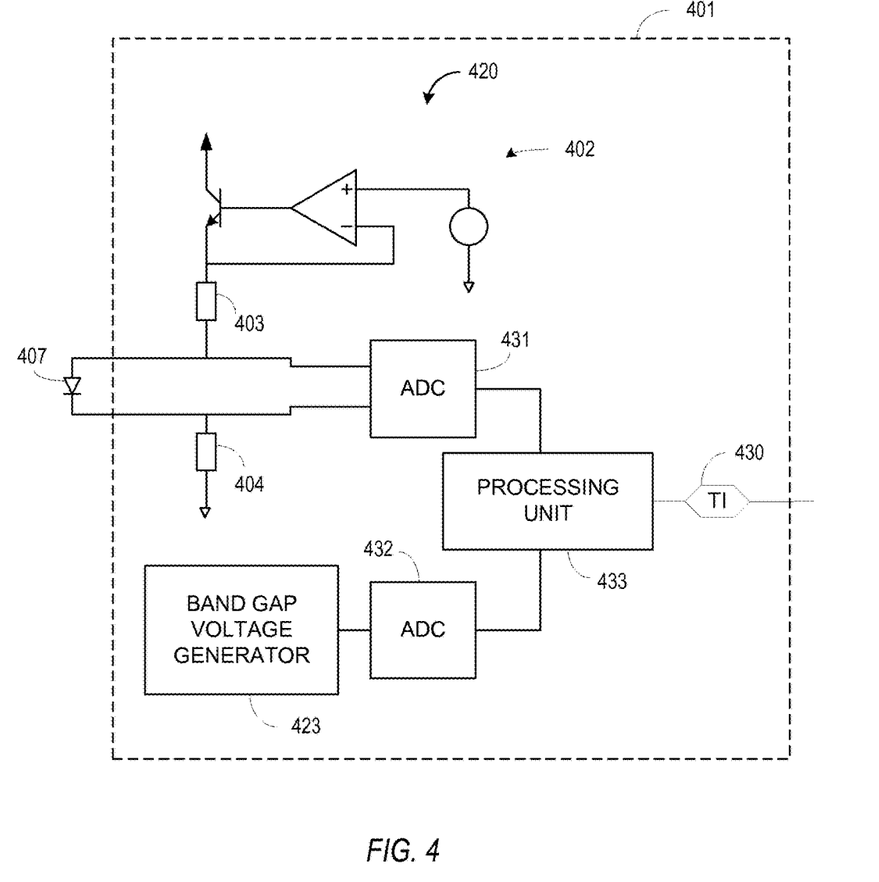
FIG. 4 illustrates generally an example of an alternative differential thermistor processing circuit.

FIG. 4 illustrates generally an example of an alternative differential thermistor processing circuit 420. In certain examples, an integrated circuit 401 can include the differential thermistor processing circuit 420. The differential thermistor processing circuit 420 can include a diode based differential thermistor circuit 402, a band-gap reference circuit 423, first and second analog to digital converters (ADCs) 431, 432 and a processing unit 433. The thermistor circuit 402 can provide a differential voltage related to an ambient temperature about a thermistor diode 407, such as a thermistor diode coupled externally to the integrated circuit 401. In an example, the thermistor diode 407 can be positioned remote from the differential thermistor processing circuit 420. The differential thermistor circuit 402 can include a first impedance 403 coupled to one terminal of the thermistor diode 407 and a second impedance 404 coupled to another terminal of the thermistor diode 407. The first and second impedances 403, 404 can reduce the effect of common mode noise on the voltage sensed across the terminals of the thermistor diode 407. In certain examples, the first and second impedances 403, 404 can include first and second resistors. The voltage across the thermistor diode 407 can be converted to digital sensed information using the first ADC 431. A band-gap voltage generator 423 can provide band-gap voltage information for processing with the thermistor diode information. An output of the band-gap voltage generator 423 can be converted to digital reference information using the second ADC 432. The processing unit 433 can process the sensed information and the reference information received from the first and second ADCs 431, 432 to generate temperature information 430 relevant to the location of the thermistor diode 407. Such information can be used for a variety of applications, especially for applications susceptible to noise, including, but not limited to, triggering temperature related operation changes of devices including the integrated differential thermistor processing circuit. Such devices include, but are not limited to, wireless communication devices, switch devices, devices configured to operate in extreme temperatures or which can cause extreme temperatures and can adapt operation during exposure to extreme temperatures. In certain examples, the processing unit 433 can determine a value difference between the reference information and sensed information. In some examples, the processed information derived from the reference and sensed information can be multiplied by a conversion factor to provide temperature information 430 about the location of the thermistor diode 407. In certain examples, the processed information can be indicative of a voltage derived from the sensed information and the reference information and the processing unit can use a conversion formula for the thermistor diode 407 to convert the voltage to temperature information 430.

In an example, the temperature information 430 can be further processed by other circuits, such as other circuits of the integrated circuit 401, or other circuits external to the integrated circuit 401.

Figure 5:
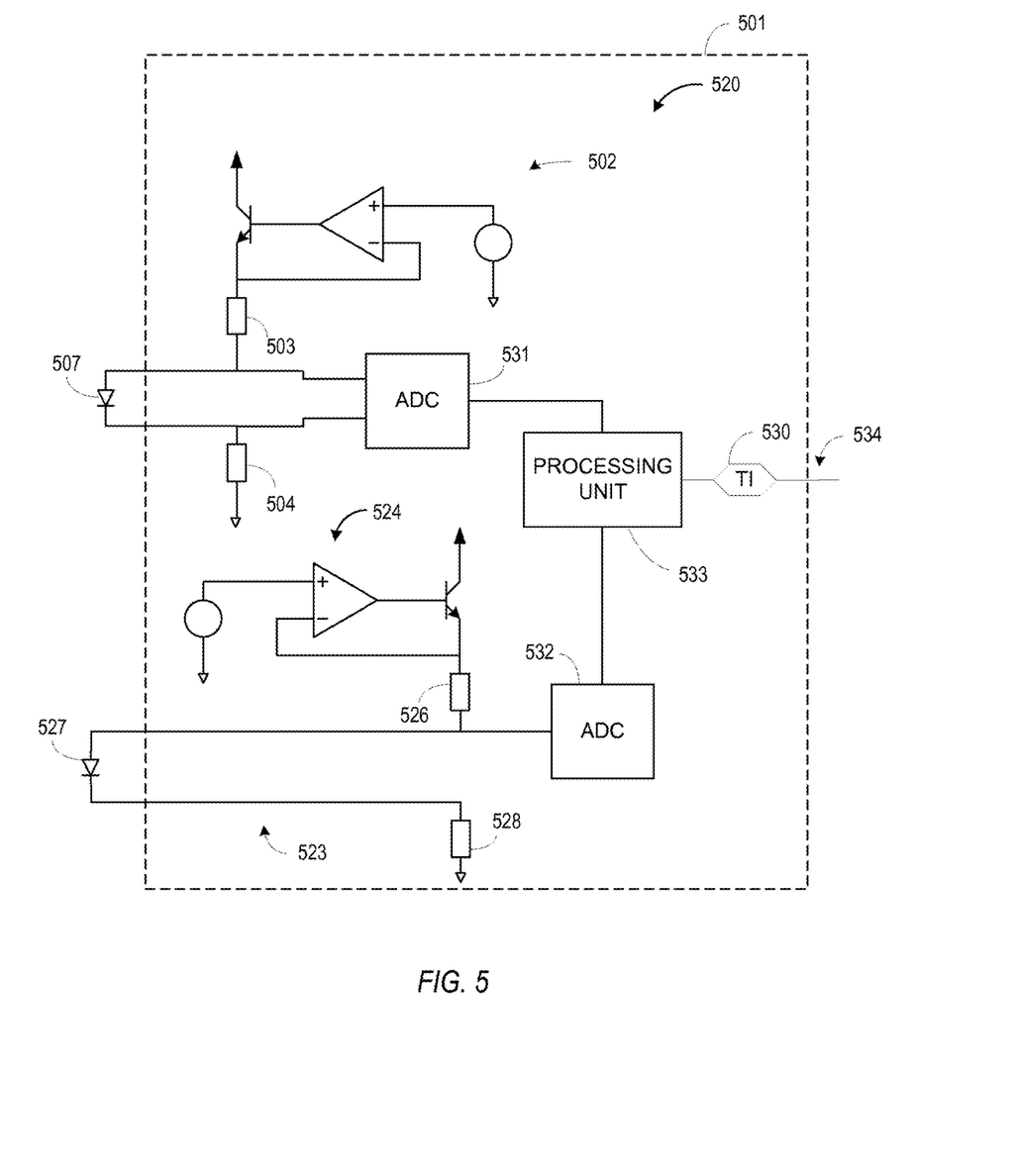
FIG. 5 illustrates generally an example of an alternative differential thermistor processing circuit.

FIG. 5 illustrates generally an example of an alternative differential thermistor processing circuit 520. In an example, an integrated circuit 501 can include the differential thermistor processing circuit. In an example, the differential thermistor processing circuit 520 can include a diode based differential thermistor circuit 502, a diode based reference circuit 523, first and second analog-to-digital converters 531, 532 and a processing unit 533. In an example, the diode based differential thermistor circuit 502 can provide a differential voltage related to an ambient temperature about a diode 507 connected external to the integrated circuit 501. In some examples, the diode 507 can be positioned remote from the integrated circuit 501. In other examples, the diode 507 can be included in the integrated circuit 501. The differential thermistor circuit 502 includes a first impedance 503 coupled to one terminal of the thermistor diode 507 and a second impedance 504 coupled to another terminal of the thermistor diode 507. The first and second impedances 503, 504 can reduce the effect of common mode noise on the voltage sensed between the terminals of the thermistor diode 507. In certain examples, the first and second impedances 503, 504 can include first and second resistors. The voltage across the thermistor diode 507 can be converted to first digital information using the first ADC 531. A diode based reference circuit 523 can provide reference voltage information for processing with the thermistor diode information.

The diode based reference circuit 523 can include a voltage follower 524, and a plurality of devices to provide an reference voltage information to a second ADC 532. The plurality of devices can include first and second impedances 526, 528, and a reference diode 527. In certain examples, the first and second impedances 526, 528 of the diode based reference circuit 523 can include first and second resistors. The voltage follower can apply a bias voltage to the series-connected devices, first and second impedances 526, 528, and the reference diode 527. The reference voltage information can include a voltage at a node of the reference diode 507.

In an example, an output of the diode based reference circuit 523 can be converted to second digital information using the second ADC 532. The processing unit 533 can process the digital information received from the first and second ADCs 531, 532 to generate temperature information 530 relevant to the location of the thermistor diode 507. In some examples, the integrated circuit 501 can include the differential thermistor processing circuit 520 as well as other circuits. In some examples, the temperature information 530 can be available to the other circuits. In some examples, the temperature information 530 can be provided at an output 534 of the integrated circuit 501. In some examples, a digital signal includes the temperature information 530. In some examples, an analog signal includes the temperature information 530. In some examples, an analog signal and a digital signal includes the temperature information 530. In an example, the temperature information 530 can be further processed by other circuits, such as other circuits of the integrated circuit 501, or other circuits external to the integrated circuit 501.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, although the examples above have been described relating to PNP devices, one or more examples can be applicable to NPN devices. In other examples, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A circuit comprising:
    a first resistor configured to be coupled to a first terminal of a temperature-sensitive resistance;
    a second resistor configured to be coupled to a second terminal of the temperature-sensitive resistance;
    a temperature information circuit configured to:
        receive a first voltage from the first terminal of the temperature-sensitive resistance;
        receive a second voltage from the second terminal of the temperature-sensitive resistance; and
        provide temperature information based on the first voltage and the second voltage, the temperature information circuit including:
            a first comparison circuit configured to determine a difference between the first voltage and the second voltage; and
            a second comparison circuit configured to compare an output of the first comparison circuit to a reference.

2. The circuit of claim 1, wherein a value of the first resistor substantially corresponds to a value of the second resistor.

3. The circuit of claim 1, further comprising:
    a voltage follower coupled to a preset voltage, the voltage follower configured to provide a bias voltage across the first resistor, the second resistor and the temperature-sensitive resistance; and a power control circuit responsive to an enable input signal to limit power consumption of the circuit.

4. The circuit of claim 1, wherein the first comparison circuit includes an analog-to-digital converter (ADC) configured to provide a digital information corresponding with a voltage difference between the first terminal of the temperature-sensitive resistance and the second terminal of the temperature-sensitive resistance.

5. The circuit of claim 1, wherein the reference is a band-gap voltage.

6. The circuit of claim 5, wherein the temperature-sensitive resistance includes at least one of a diode or a thermistor.

7. The circuit of claim 1, wherein:
the temperature information circuit includes a reference generator configured to be coupled to a reference resistor and to provide the reference, the reference including a reference voltage;
the reference generator including:
a third resistor configured to be coupled to the first terminal of the reference resistor; and
a fourth resistor configured to be coupled to the second terminal of the reference resistor.

8. The circuit of claim 7, wherein a value of the third resistor substantially corresponds to the value of the first resistor, and a value of the fourth resistor substantially corresponds to the value of the second resistor.

9. The circuit of claim 7, wherein the circuit is an integrated circuit and the reference resistor includes a resistor external to the integrated circuit.

10. The circuit of claim 9, wherein:
the temperature-sensitive resistance includes a first diode; and
the reference resistor includes a second diode.

11. A circuit comprising:
a first resistor configured to be coupled to a first terminal of a temperature-sensitive resistance;
a second resistor configured to be coupled to a second terminal of the temperature-sensitive resistance;
a temperature information circuit configured to:
receive a first voltage from the first terminal of the temperature-sensitive resistance;
receive a second voltage from the second terminal of the temperature-sensitive resistance; and
provide temperature information based on the first voltage and the second voltage, the temperature information circuit including:
a first differential comparator configured to determine a difference between the first voltage and the second voltage; and
a second differential comparator configured to compare an output of the first differential comparator to a reference voltage, the second differential comparator having an output corresponding with a temperature of the temperature-sensitive resistance.

12. The circuit of claim 11, further comprising a voltage follower circuit coupled with the second differential comparator, the voltage follower circuit being configured to provide the reference voltage to the second differential comparator.

13. The circuit of claim 11, wherein the temperature-sensitive resistance includes at least one of a diode or a thermistor.

14. The circuit of claim 11, further comprising:
a voltage follower coupled to a preset voltage, the voltage follower being configured to provide a bias voltage across the first resistor, the second resistor and the temperature-sensitive resistance.

15. The circuit of claim 14, further comprising a power control circuit configured to limit power consumption of the circuit.

16. A circuit comprising:
a first resistor configured to be coupled to a first terminal of a temperature-sensitive resistance;
a second resistor configured to be coupled to a second terminal of the temperature-sensitive resistance;
a temperature information circuit configured to:
receive a first voltage from the first terminal of the temperature-sensitive resistance;
receive a second voltage from the second terminal of the temperature-sensitive resistance; and
provide temperature information based on the first voltage and the second voltage, the temperature information circuit including:
a first analog-to-digital converter configured to determine a difference between the first voltage and the second voltage, and generate first digital information corresponding with the difference between the first voltage and the second voltage; and
a comparison circuit configured to compare the first digital information to second digital information, the second digital information corresponding with a reference voltage, an output of the comparison circuit corresponding with a temperature of the temperature-sensitive resistance.

17. The circuit of claim 16, further comprising a reference circuit configured to provide the second digital information to the comparison circuit, the reference circuit including:
a band gap voltage generator; and
a second analog-to-digital converter coupled with the band gap voltage generator and the comparison circuit, the second analog-to-digital converter being configured to provide the second digital information to the comparison circuit based on an output voltage of the band gap voltage generator.

18. The circuit of claim 16, further comprising a reference circuit configured to provide the second digital information to the comparison circuit, the reference circuit including:
a voltage follower circuit; and
a second analog-to-digital converter coupled with the voltage follower circuit and the comparison circuit, the second analog-to-digital converter being configured to provide the second digital information to the comparison circuit based on an output voltage of the voltage follower circuit.

19. The circuit of claim 16 further comprising:
a voltage follower coupled to a preset voltage, the voltage follower configured to provide a bias voltage across the first resistor, the second resistor and the temperature-sensitive resistance; and
a power control circuit configured to limit power consumption of the circuit.

20. The circuit of claim 16, wherein the temperature-sensitive resistance includes at least one of a diode or a thermistor.

* * * * *